Aug. 26, 1958     J. O. MALONEY ET AL     2,848,800

METHOD OF JACKETING URANIUM BODIES

Filed May 28, 1945

Witnesses:
Herbert E. Metcalf
Albert F. Bower

Inventors:
James O. Maloney
Earl B. Haines
By: John B. Tepe
Attorney

United States Patent Office 2,848,800
Patented Aug. 26, 1958

2,848,800

METHOD OF JACKETING URANIUM BODIES

James O. Maloney, Wilmington, Del., Earl B. Haines, Richland, Wash., and John B. Tepe, Wilmington, Del., assignors to the United States of America as represented by the United States Atomic Energy Commission Application May 28, 1945, Serial No. 596,215

4 Claims. (Cl. 29—447)

The present invention relates to new and useful improvements in the method of jacketing metallic bodies with metal jackets and more particularly to the method of encasing metallic bodies of a highly corrosive nature in close fitting metal jackets and excluding air from inside the jacket and sealing the metallic bodies from contact with external gases and liquids. The jacketed bodies prepared as herein contemplated are especially suited to use in neutronic reactors.

In neutronic reactors a neutron fissionable isotope such as $U^{233}$, $U^{235}$ or $94^{239}$ or mixtures thereof is subjected to fission by absorption of neutrons and a self-sustaining chain reaction is established by the neutrons evolved by the fission. In general such reactors comprise bodies of compositions containing such fissionable material as, for example, natural uranium, disposed in a neutron slowing material which slows the neutrons to thermal energies. Such a slowing material is termed a neutron moderator. Carbon, beryllium and $D_2O$ are typical moderators suitable for such use. Heat is evolved during the reaction which is removed by passage of a coolant through the reactor or in heat exchange relationship therewith. Specific details of the theory and essential characteristics of such reactors are set forth in co-pending application of Enrico Fermo and Leo Szilard, Serial No. 568,904, filed December 19, 1944, now Patent No. 2,707,656, issued May 17, 1955.

The fissionable bodies have a sheath of non-fissionable material such as aluminum enclosing them and generally rest in channels through which a coolant passes.

In cooling the neutron bombarded metallic body, control of the temperature of the metallic body is important since it is desirable that the temperatures of both the body and the coolant do not exceed certain limits. For example, when a liquid is used as the coolant, the temperature of the liquid preferably is maintained below the boiling point as a change to the vapor state would result in an alteration of the rate of neutron bombardment. Also, the temperature of the metallic body cannot be permitted to exceed its melting point. The contact of a cooling fluid passing through the conduit containing the jacketed metallic bodies is relied upon to remove heat from the jackets and thereby maintain the metallic body in some predetermined temperature range. As this removal of heat by a controllable flow of water is relied upon to control the temperature of the metallic body by the removal of heat from the jacket on the body, it is necessary that the thermal transfer rate from the body to the jacket and from the jacket to the coolant be of high value. The protective jacket or cover upon the metallic body is desirably fitted to conform as tightly as possible to the surface of the body and provide the best possible thermal conductivity between the jacket and the body. The elimination of air spaces between the jacket and the body is particularly desirable because of the low thermal conductivity of air.

An object of this invention is to provide a new method for producing a metal jacketed fissionable metal body.

Other objects and advantages of the invention will become apparent from the following description and drawings in which.

Figure 1:
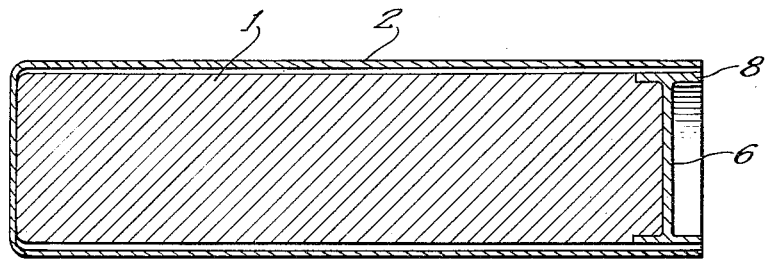
Fig. 1 is a diagrammatic longitudinal sectional view of a fissionable body loosely enclosed in an aluminum barrier or sheath.

The material of the jacket must have a relatively low neutron absorption cross-section as well as a high thermal conductivity to facilitate the cooling of the uranium metal or other fissionable body. Aluminum is well suited to be employed as a jacket because it not only has a favorable conductivity and a slow reactivity with the customary coolants air and water but also, because of its malleability, permits the formation of a thin walled jacket which may be drawn on to the uranium body to tightly fit the surface of the body.

The metallic fissionable body, which may be natural uranium metal, uranium metal containing more than natural concentrations of a fissionable isotope or $Th^{232}$ mixtures with a fissionable isotope, is preferably machined and polished to remove imperfections and roughness on the surface so that the jacket may conform to the surface with a minimum of discontinuity therefrom and provide the optimum thermal conductivity between the body and the jacket. A break in the contact between the contiguous surfaces of the jacket and the metallic body and particularly a separation across which there is a large temperature drop hinders complete and uniform cooling of the metallic body. Also, such a break in contact between the surface of the jacket and the metallic body causes a thermal electrolytic action with accompanying corrosion, usually at one end of the break, and a hot spot at the other end of the break. To obtain a tight fit of the aluminum jacket on the uranium body, a combination of drawing and shrink fitting is effective.

In usual methods of shrink fitting two metal pieces together, one of the pieces is generally raised or lowered in temperature while the other is maintained at room temperature so that a temperature differential is obtained. The heating or cooling in turn causes an expansion or contraction on the part of the heated or cooled member in which state the part is appropriately fitted to the unchanged part and the convergence of the two in temperature employed to tighten the fit. This technique when applied to fitting a thin aluminum jacket over a uranium slug presents the difficulty that the thin jacket usually about 0.005 to 0.15 inch thick having a low mass and low heat content rapidly assumes the temperature of the larger uranium slug, which is, as pointed out in the co-pending application referred to above, approximately 1.1 inches in diameter, and the differential in thermal expansion is lost. The aluminum jacket contracts around the uranium body almost at the instant that the uranium is inserted in the jacket and before the operation of insertion can be completed and thus hinders slipping the uranium body into the jacket.

We have discovered that a differential in thermal expansion between the aluminum jacket and the uranium body can be employed to obtain a tight fit of the jacket on the uranium body by heating both the uranium body and the aluminum jacket. Aluminum has a co-efficient of thermal expansion which is approximately $8 \times 10^{-6}$ per degree centigrade per unit length greater than the co-efficient of thermal expansion for uranium. This differential in the co-efficients of thermal expansion causes the diameter of the aluminum metal jacket to decrease about 3 mils more than the diameter of the uranium metal body for each 150° C. of temperature drop.

By heating both the aluminum jacket and the uranium body to above 180° C. and fitting the body into the jacket at this elevated temperature, upon cooling to room temperature, a tight fit will be obtained of the aluminum jacket on the uranium body. This tight fit clenches the aluminum jacket on the uranium body eliminating the necessity of a bonding material and provides good thermal contact between the jacket and body.

In jacketing the metallic body, however, unless the body has been previously machined to a high polish, imperfections on the surface of the body will cause breaks in the contiguity of the surfaces of the jacket and the metallic body. In order to obtain the best thermal transfer from the metallic body to the coolant at the points of poor thermal contact, it is desirable that air be eliminated from the inside of the jacket. The break in the contiguity between the jacket and the uranium body results in spaces between the surfaces which if filled with air will cause poor thermal transfer from the metallic body and poor or non-uniform cooling of the metallic body.

As polishing the surface of the uranium body is wasteful and difficult, the jacket is preferably fitted over slight irregularities in the body surface. In accordance with the present invention a satisfactory jacketed fissionable body of high thermal conductivity may be secured without excessive polishing by filling the jacket or sheath with a gas that has high thermal conductivity and low neutron absorption so that the spaces between the jacket and body surfaces will be filled with this gas which will become trapped between the surfaces and provide a better thermal transfer than air and will absorb less neutrons during use. Helium is particularly suitable for this purpose.

Figure 2:
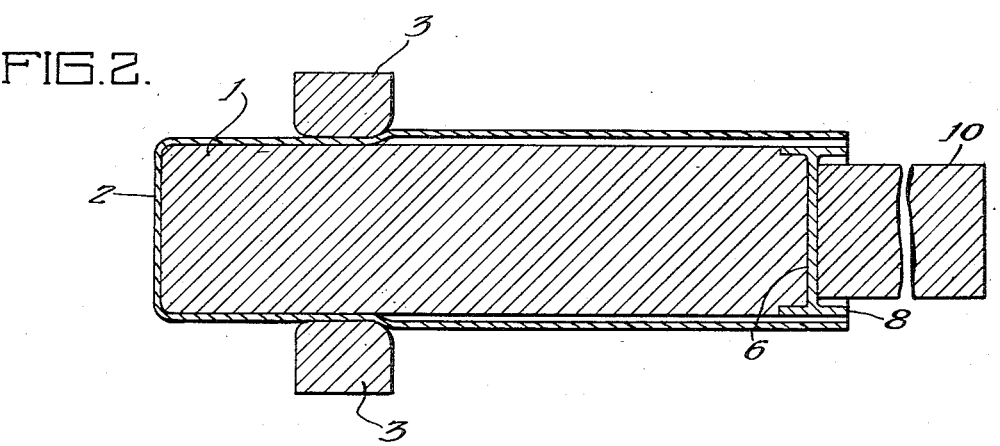
Fig. 2 is a similar view illustrating the assembly of the aluminum jacket or barrier as it is drawn through a die into tight contact with the fissionable body.

In the construction of the jacketed body as herein contemplated, the uranium body is fitted into an aluminum jacket, as shown in Fig. 1, while the jacket is in a helium atmosphere, and while the metal body and metal jacket are at an elevated temperature preferably above about 180° C. so that the greater coefficient of expansion of the aluminum will provide sufficient clearance to permit an easy insert of the metallic body. The assembly of the aluminum jacket and the uranium body is drawn through a die, as shown in Fig. 2, at the elevated temperature drawing the aluminum jacket to fit tightly about the uranium body and the aluminum flows and is compressed into the irregularities on the surface of the uranium body. The drawn-fit uranium body with its aluminum jacket is then cooled in a helium atmosphere to provide a tight fit of the jacket on the body. To aid in a removal of gas remaining trapped between the jacket and the uranium body, the assembly is cooled so that the bottom or closed end of the jacket will cool first, resulting in a progressive constriction contracting the aluminum on the uranium body and pressing out gas remaining in any pockets between the contacting surfaces.

In a preferred embodiment of a method of jacketing a uranium body according to my invention as shown in Fig. 1, a uranium body 1, provided with an aluminum end cap 6 which has an outwardly extending lip 8 is fitted into an aluminum jacket 2 at a temperature above 180° C. and preferably in a helium atmosphere. The parts are dimensioned so that the greater co-efficient of expansion of the aluminum will provide sufficient clearance to permit an easy insert of the metallic body 1 into the tubular jacket 2. The assembly of the body 1 in the jacket 2 is maintained at an elevated temperature in a helium atmosphere and forced through a die 3 by piston 10 as shown in Fig. 2, which drawing fits the jacket 2 tightly about the uranium body 1, and conforms it to irregularities on the surface of the uranium body 1.

The jacketed body is then cooled by suitable means. The chilling or cooling preferably is controlled so that it occurs first at the closed end and proceeds along the jacket 2 to the open end and thus forces trapped gas out from between the walls at least to a substantial degree. The open end may then be closed in any suitable manner.

Figure 3:
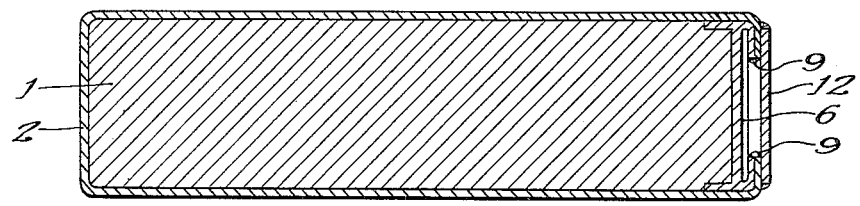
Fig. 3 is a diagrammatic longitudinal sectional view of a completed jacketed body.

As shown in Fig. 3 the closing may be effected by bending the sheath and lip 8 inwardly to lap over the body portion of the end cap 6 and the lip is welded to the jacket by a circumferential weld 9, which hermetically seals the jacket against entry or escape of gas to or from the interior thereof. An end plate 12 is then welded and sealed to the end of the jacketed body thus produced.

It will be apparent to those skilled in the art that various modifications may be made without departing from the principles of the invention as disclosed herein, and for that reason, it is not intended that the invention should be limited other than by the scope of the appended claims.

What is claimed is:

1. In the fabrication of jacketed uranium bodies, the method of tightly jacketing a uranium rod approximately 1.1 inches in diameter in an aluminum jacket of between 0.005 and 0.15 inch thickness comprising heating both the aluminum jacket and the uranium body to a temperature above 180° C. and below the melting points thereof, inserting the body into the jacket while maintaining both at said temperature, and thereafter cooling the assembly.

2. In the fabrication of jacketed uranium bodies, the method of tightly jacketing a uranium rod approximately 1.1 inches in diameter in an aluminum jacket of between 0.005 and 0.15 inch thickness closed at one end comprising heating both the aluminum jacket and the uranium body to a temperature above 180° C., and below the melting points thereof, inserting the body into the jacket while maintaining both at said temperature, and thereafter progressively cooling the assembly from the closed end of the jacket to the open end thereof.

3. In the fabrication of jacketed uranium bodies, the method of tightly jacketing a uranium rod approximately 1.1 inches in diameter in an aluminum jacket of between 0.005 and 0.15 inch thickness closed at one end comprising heating both the aluminum jacket and the uranium body to a temperature above 180° C., and below the melting points thereof, inserting the body into the jacket while maintaining both at said temperature, drawing the jacket to fit tightly over the body while maintaining both at said temperature, and thereafter progressively cooling the assembly from the closed end thereof to the open end thereof.

4. In the fabrication of jacketed uranium bodies, the method of tightly jacketing a uranium rod approximately 1.1 inches in diameter in an aluminum jacket of between 0.005 and 0.15 inch thickness comprising heating both the aluminum jacket and the uranium body to a temperature above 180° C., and below the melting points thereof, inserting the body into the jacket while maintaining both at said temperature in a helium atmosphere, and thereafter cooling the assembly in a helium atmosphere.

References Cited in the file of this patent

UNITED STATES PATENTS

| | | |
|---|---|---|
| 1,101,729 | Davis | June 30, 1914 |
| 1,346,535 | Fedden | July 13, 1920 |
| 1,374,110 | Pittevil | Apr. 5, 1921 |
| 1,956,818 | Acre | May 1, 1934 |
| 2,059,584 | Johnson | Nov. 3, 1936 |
| 2,091,263 | Ball | Aug. 31, 1937 |